US010380510B1

(12) United States Patent
Slack et al.

(10) Patent No.: US 10,380,510 B1
(45) Date of Patent: Aug. 13, 2019

(54) METHOD AND SYSTEM FOR INVENTORY MANAGEMENT

(75) Inventors: Brian N. Slack, Lebanon, IL (US); Douglas J. Dwyer, St. Peters, MO (US); William E. Krechel, Thompson's Station, TN (US)

(73) Assignee: The Boeing Company, Chicago, IL (US)

( * ) Notice: Subject to any disclaimer, the term of this patent is extended or adjusted under 35 U.S.C. 154(b) by 470 days.

(21) Appl. No.: 12/569,380

(22) Filed: Sep. 29, 2009

(51) Int. Cl.
*G06Q 10/06* (2012.01)
*G06Q 20/20* (2012.01)
*G06Q 50/28* (2012.01)

(52) U.S. Cl.
CPC ... *G06Q 10/0631* (2013.01); *G06Q 10/06313* (2013.01); *G06Q 20/20* (2013.01); *G06Q 20/203* (2013.01); *G06Q 50/28* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,216,612 | A * | 6/1993 | Cornett et al. | 700/96 |
| 7,080,026 | B2 * | 7/2006 | Singh et al. | 705/10 |
| 7,313,534 | B2 * | 12/2007 | Scheer | 705/9 |
| 7,644,863 | B2 * | 1/2010 | Chen et al. | 235/385 |
| 7,664,757 | B1 * | 2/2010 | Boesjes | 707/792 |
| 7,788,145 | B2 * | 8/2010 | Wadawadigi et al. | 705/28 |
| 7,831,463 | B2 * | 11/2010 | Nagar | 705/7.38 |
| 2002/0042735 | A1 * | 4/2002 | Narahara et al. | 705/10 |
| 2003/0154135 | A1 * | 8/2003 | Covington et al. | 705/26 |
| 2003/0233293 | A1 * | 12/2003 | Hsu et al. | 705/28 |
| 2008/0103845 | A1 * | 5/2008 | Owens et al. | 705/7 |
| 2010/0205044 | A1 * | 8/2010 | Scheer | 705/10 |

OTHER PUBLICATIONS

Nissan, Mark E & Sengupta, Kishore (2006). Incorporating software agents into supply chains: experimental investigation with a procurement task. MIS Quarterly 30(1), 145-166.*
Solomon, R et al. (2000). Electronic part life cycle concepts and obsolescence forecasting. IEEE Transactions on Components and Packaging Technologies 23(4), p. 707-717.*
Feldman, K. & Sandborn, P. (2007). Integrating technology obsolescence considerations into product design planning. Proceedings of the ASME 2007 Int'l Design Engineering Technical Conferences & Computers and Information in Engineering Conference. Las Vegas, NV. p. 1-8.*
Sandborn, P. et al. (2007). A data mining based approach to electronic part obsolescence forecasting. IEEE Transactions on Components and Packaging Technologies 30(3), p. 397-401.*
Solomon, R et al. (2000). Electronic part life cycle concepts and obsolescence forecasting. IEEE Transactions on Components and Packaging Technologies 23(4), p. 707-717 (hereinafter "Solomon").*

* cited by examiner

*Primary Examiner* — Peter Ludwig
(74) *Attorney, Agent, or Firm* — Yee & Associates, P.C.

(57) ABSTRACT

The different advantageous embodiments provide a method for inventory management. A number of parts to monitor is identified. A number of agents is generated to form a number of agent societies. A number of tasks is assigned to the number of agent societies. Dynamic task result data is received from the number of agent societies. Inventory information is predicted based on the task result data.

24 Claims, 8 Drawing Sheets

METHOD AND SYSTEM FOR INVENTORY MANAGEMENT

BACKGROUND INFORMATION

1. Field

The present disclosure relates generally to asset procurement and more particularly to monitoring the procurability of assets. Still more particularly, the present disclosure relates to a method and system for predictive inventory management.

2. Background

An aircraft manufacturer is dependent upon various suppliers to produce and provide the parts required to construct and maintain an aircraft. Often, a part will be discontinued or scheduled for obsolescence by a supplier. Obsolescence refers to a person, object, or service no longer being wanted even though it may still be in good working order. Obsolescence frequently occurs because a replacement has become available that is superior in one or more aspects.

There is little collaboration and sharing of obsolescence discontinuance information between aircraft manufacturers and vendors or suppliers. Typically, the aircraft manufacturer depends upon the vendor or supplier to notify of intentions to discontinue a part with enough lead time to make procurement decisions. When a part is discontinued or no longer available to the aircraft manufacturer, procurement of a replacement part or other alternate manufacturing solutions may cause delay and increased cost in manufacturing.

Therefore, it would be advantageous to have a method and apparatus that takes into account one or more of the issues discussed above, as well as possibly other issues.

SUMMARY

The different advantageous embodiments provide a method for inventory management. A number of parts to monitor is identified. A number of agents is generated to form a number of agent societies. A number of tasks is assigned to the number of agent societies. Dynamic task result data is received from the number of agent societies. Inventory information is predicted based on the task result data.

The different advantageous embodiments further provide a method for monitoring parts obsolescence. A number of tasks is received. The number of tasks include monitoring a number of parts. The number of tasks is decomposed into a number of sub-tasks. The number of sub-tasks is assigned to a number of agents. The number of sub-tasks is executed using the number of agents.

The different advantageous embodiments further provide a computer program product having computer usable program code stored on a computer recordable medium. The computer program product comprises program code including program code for identifying a number of parts to monitor, generating a number of agents to form a number of agent societies, assigning a number of tasks for monitoring the number of parts to the number of agent societies, receiving the data from the number of agent societies monitoring the number of parts during performance of the number of tasks, and predicting inventory information for the number of parts based on the data received to form predicted inventory information. The number of agents is configured to monitor the number of parts. The number of agent societies is configured to obtain data from the number of tasks during performance of the number of tasks by the number of agents.

The different advantageous embodiments further provide a system for inventory management comprising an agent generation process, a prediction process, and a data processing system. The agent generation process is configured to generate a number of agent societies. The prediction process is configured to generate predicted inventory information. The data processing system is configured to execute the agent generation process and the prediction process. The data processing system executes the agent generation process and the prediction process to identify a number of parts to monitor, generate a number of agents to form a number of agent societies, assign a number of tasks for monitoring the number of parts to the number of agent societies, receive the data from the number of agent societies monitoring the number of parts during performance of the number of tasks, and predict inventory information for the number of parts based on the data received to form predicted inventory information. The number of agents is configured to monitor the number of parts. The number of agent societies is configured to obtain data from the number of tasks during performance of the number of tasks by the number of agents.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
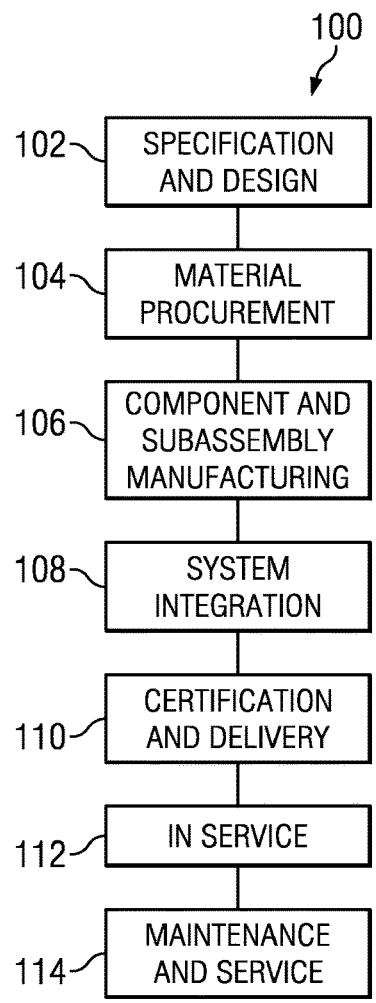
FIG. 1 is an illustration of an aircraft manufacturing and service method in accordance with an advantageous embodiment.
Figure 2:
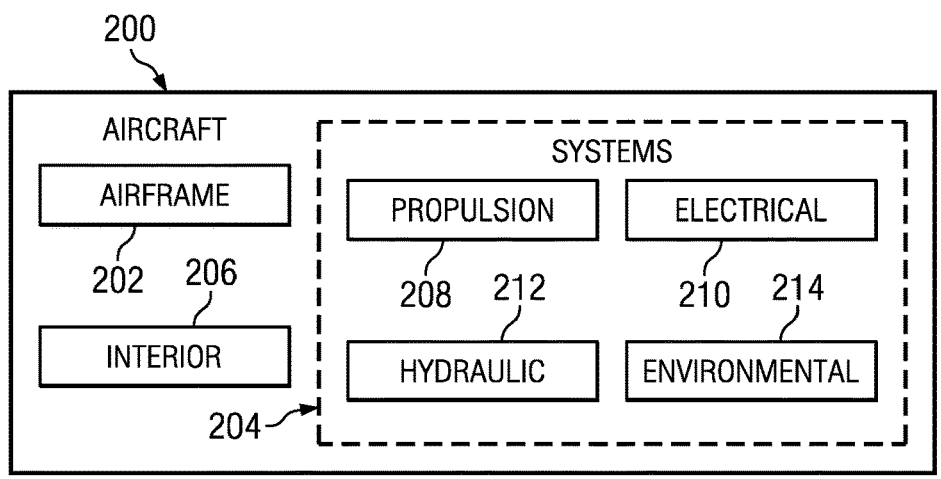
FIG. 2 is illustration of an aircraft in which an advantageous embodiment may be implemented.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 may take place. Thereafter, aircraft 200 in FIG. 2 may go through certification and delivery 110 in order to be placed in service 112. While in service by a customer, aircraft 200 in FIG. 2 may be scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 may be produced by aircraft manufacturing and service method 100 in FIG. 1 and may include airframe 202 with a plurality of systems 204 and interior 206. Examples of systems 204 may include one or more of propulsion system 208, electrical system 210, hydraulic system 212, and environmental system 214. Any number of other systems may be included. Although an aerospace example is shown, different advantageous embodiments may be applied to other industries, such as the automotive industry. Additionally, different advantageous embodiments may be applied to other infrastructure industries, such as bridges and buildings.

Apparatus and methods embodied herein may be employed during any one or more of the stages of aircraft manufacturing and service method 100 in FIG. 1. For example, components or subassemblies produced in component and subassembly manufacturing 106 in FIG. 1 may be inspected while aircraft 200 is in maintenance and service 114 in FIG. 1.

Also, one or more apparatus embodiments, method embodiments, or a combination thereof may be utilized during service stages, such as maintenance and service 114 and in service 112 in FIG. 1, for example, without limitation, by substantially expediting the inspection and/or maintenance of aircraft 200.

As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C.

The different advantageous embodiments recognize and take into account a number of different considerations. For example, the different advantageous embodiments take into account and recognize that currently used parts management methods depend upon the supplier to inform a prime, such as an aircraft manufacturer for example, of the supplier's intentions to discontinue a part. Lead time to make procurement decisions may also be dependent upon this supplier notification. Notification is typically a manual process and is dependent upon the supplier issuing a discontinuance notice. These discontinuance notices are predominately issued by electronic manufacturers. Non-electronic parts are generally on a longer life cycle curve than electronic suppliers, with little to no advanced discontinuance notification.

The different advantageous embodiments further take into account and recognize that current suppliers are often reluctant to issue a discontinuance notice since they contend they can still manufacture the part if needed. However, a request to manufacture the part in the future if needed may result in the original tooling and manufacturing processes being unavailable or no longer supported.

The different advantageous embodiments further take into account and recognize that there is currently limited obsolescence discontinuance information sharing between primes and suppliers in both the electronic and non-electronic parts discontinuance notification systems. A growing percentage of electronic parts obsolescence discontinuance notices are being issued by suppliers and entered into government reporting tools due to requirements levied on electronic parts suppliers from the government. No such requirement or system currently exists for management of non-electronic parts obsolescence management.

Thus, the different advantageous embodiments may provide a method for inventory management. A number of parts to monitor is identified. A number of agents is generated to form a number of agent societies. A number of tasks is assigned to the number of agent societies. Dynamic task result data is received from the number of agent societies. Inventory information is predicted based on the task result data.

The different advantageous embodiments further provide a method for monitoring parts obsolescence. A number of tasks is received. The number of tasks includes monitoring a number of parts. The number of tasks is decomposed into a number of sub-tasks. The number of sub-tasks is assigned to a number of agents. The number of sub-tasks is executed using the number of agents.

The different advantageous embodiments further provide a computer program product having computer usable program code stored on a computer recordable medium. The computer program product comprises program code including program code for identifying a number of parts to monitor, generating a number of agents to form a number of agent societies, assigning a number of tasks for monitoring the number of parts to the number of agent societies, receiving the data from the number of agent societies monitoring the number of parts during performance of the number of tasks, and predicting inventory information for the number of parts based on the data received to form predicted inventory information. The number of agents is configured to monitor the number of parts. The number of agent societies is configured to obtain data from the number of tasks during performance of the number of tasks by the number of agents.

The different advantageous embodiments further provide a system for inventory management comprising an agent generation process, a prediction process, and a data processing system. The agent generation process is configured to generate a number of agent societies. The prediction process is configured to generate predicted inventory information. The data processing system is configured to execute the agent generation process and the prediction process. The data processing system executes the agent generation process and the prediction process to identify a number of parts to monitor, generate a number of agents to form a number of agent societies, assign a number of tasks for monitoring the number of parts to the number of agent societies, receive the data from the number of agent societies monitoring the number of parts during performance of the number of tasks, and predict inventory information for the number of parts based on the data received to form predicted inventory information. The number of agents is configured to monitor the number of parts. The number of agent societies is configured to obtain data from the number of tasks during performance of the number of tasks by the number of agents.

Figure 3:
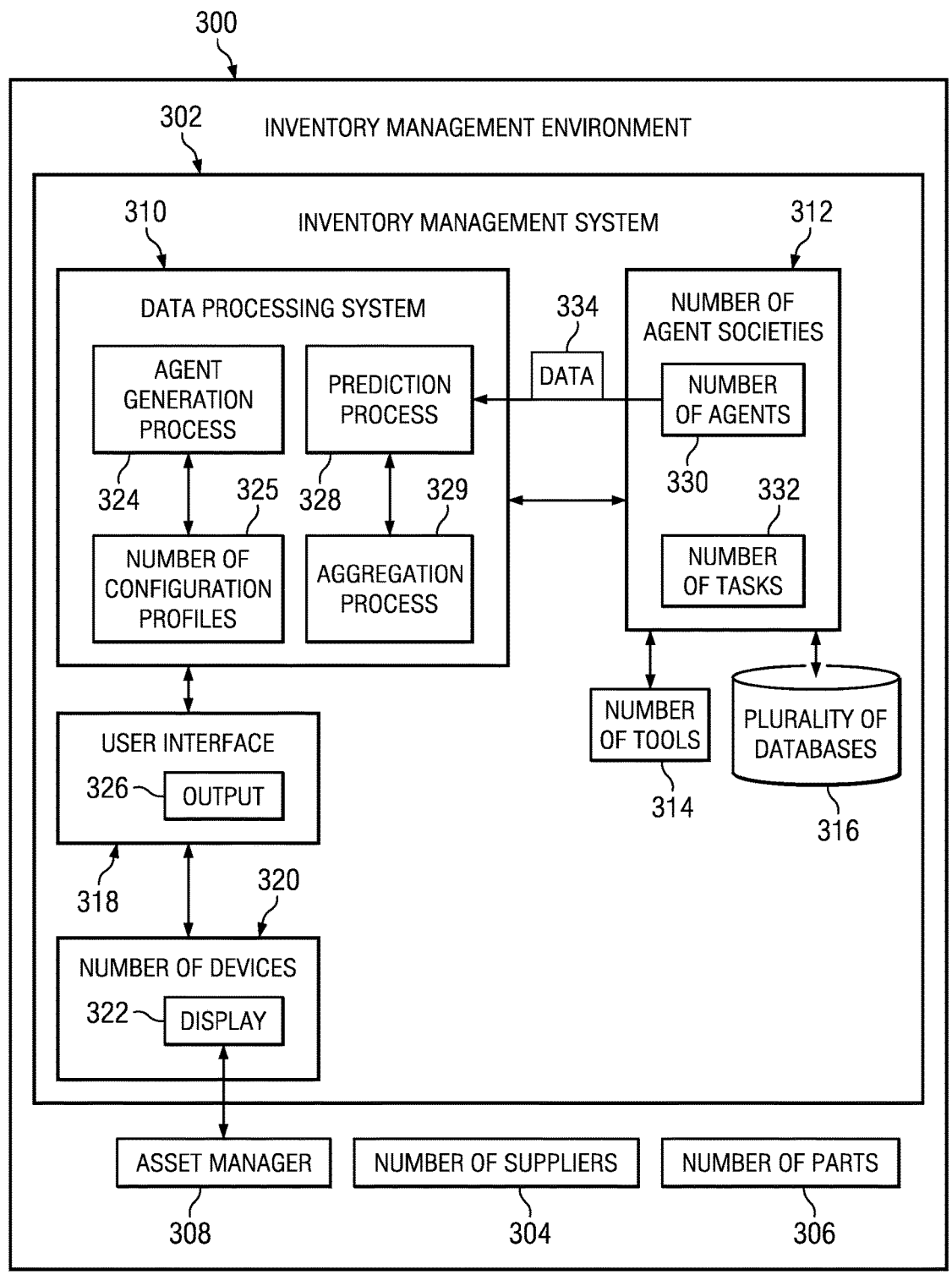
FIG. 3 is an illustration of an inventory management environment in accordance with an advantageous embodiment.

With reference now to FIG. 3, an illustration of an inventory management environment is depicted in accordance with an advantageous embodiment. Inventory management environment 300 may be implemented during any and/or a combination of specification and design 102, material procurement 104, production, component and subassembly manufacturing 106, system integration 108, maintenance and service 114 of aircraft 200 in FIG. 2, for example.

Inventory management environment 300 includes inventory management system 302, number of suppliers 304, number of parts 306, and asset manager 308. Inventory management system 302 may be used to monitor number of suppliers 304 and/or number of parts 306 for obsolescence and/or discontinuance information in order to provide information to asset manager 308.

Inventory management system 302 includes data processing system 310, number of agent societies 312, number of tools 314, plurality of databases 316, user interface 318, and number of devices 320. Asset manager 308 may use number of devices 320 to interact with user interface 318. Number of devices 320 may include devices such as, without limitation, display 322 and/or any other suitable device. Asset manager 308 may use user interface 318 to access agent generation process 324 on data processing system 310. Asset manager 308 may also use user interface 318 to view output 326 from prediction process 328.

Agent generation process 324 creates number of agents 330 and assigns each of number of agents 330 to an agent society to create number of agent societies 312. An agent is a software program with the ability to perform a task or number of tasks. Agents are configured to run continuously and autonomously once generated until they are turned off, or stopped by an outside program and/or user. An agent society is a collection of one or more agents configured to interact with each other. A number of agents communicate within the agent society framework through communication protocols and/or a number of plug-ins designed to interact with the communication protocols. These communication protocols may include, for example, without limitation, an agent publish/subscribe system, an agent blackboard system, and/or any other suitable protocol.

Agent generation process 324 uses number of configuration profiles 325 to create number of agent societies 312. Each configuration profile is directed to a particular agent society in number of agent societies 312. A configuration profile may include information, without limitation, naming number of agents 330, describing capabilities associated with an agent name, plug-ins for number of agents 330, and services needed to perform number of tasks 332. Agent generation process 324 assigns number of tasks 332 to number of agent societies 312.

Number of agent societies 312 interacts with plurality of databases 316 and number of tools 314 to complete number of tasks 332. Plurality of databases 316 may include various types of databases. Number of agents 330 is configured to read any database type. Number of agents 330 may query plurality of databases 316 in a read-only fashion, for example. Number of agents 330 generates data 334 dynamically to report on number of tasks 332 as they are executed and completed, and sends data 334 to prediction process 328. Data 334 may be, for example, without limitation, dynamic task result data. Data 334 may be continually transmitted by number of agents 330 executing number of tasks 332. Aggregation process 329 aggregates data 334 for display over user interface 318. Prediction process 328 uses data 334 aggregated by aggregation process 329 to generate output 326. Output 326 may be a predictive report of parts obsolescence, for example. Prediction process 328 may include business logic for escalating the obsolescence information for a part or number of parts. For example, a part that is indicated as procurable for the next three years in data 334, but only from a sole supplier, may be escalated to unprocurable in output 326 to advance the inventory management process for the particular part.

The illustration of inventory management environment 300 in FIG. 3 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 4:
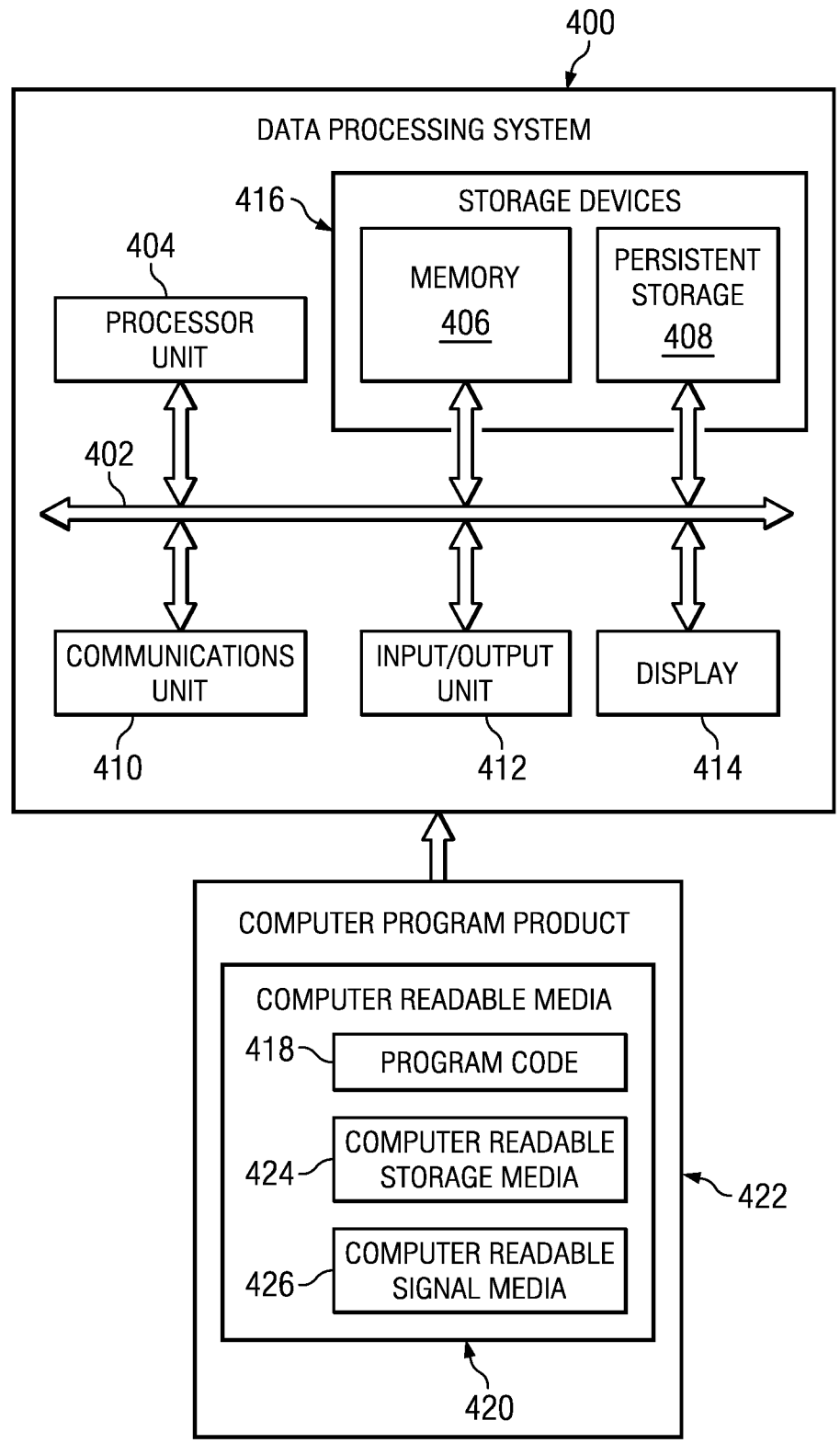
FIG. 4 is an illustration of a data processing system in accordance with an illustrative embodiment.

With reference now to FIG. 4, an illustration of a data processing system is depicted in accordance with an illustrative embodiment. Data processing system 400 may be an illustrative example of one implementation of data processing system 310 in FIG. 3, for example.

In this illustrative example, data processing system 400 includes communications fabric 402, which provides communications between processor unit 404, memory 406, persistent storage 408, communications unit 410, input/output (I/O) unit 412, and display 414.

Processor unit 404 serves to execute instructions for software that may be loaded into memory 406. Processor unit 404 may be a set of one or more processors or may be a multi-processor core, depending on the particular implementation. Further, processor unit 404 may be implemented using one or more heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices 416. A storage device is any piece of hardware that is capable of storing information, such as, for example without limitation, data, program code in functional form, and/or other suitable information either on a temporary basis and/or a permanent basis. Memory 406, in these examples, may be, for example, a random access memory or any other suitable volatile or non-volatile storage device. Persistent storage 408 may take various forms depending on the particular implementation. For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard, a mouse, and/or some other suitable input device. Further, input/output unit 412 may send output to a printer. Display 414 provides a mechanism to display information to a user.

Instructions for the operating system, applications and/or programs may be located in storage devices 416, which are in communication with processor unit 404 through communications fabric 402. In these illustrative examples the instructions are in a functional form on persistent storage 408. These instructions may be loaded into memory 406 for execution by processor unit 404. The processes of the different embodiments may be performed by processor unit 404 using computer implemented instructions, which may be located in a memory, such as memory 406.

These instructions are referred to as program code, computer usable program code, or computer readable program code that may be read and executed by a processor in processor unit 404. The program code in the different embodiments may be embodied on different physical or tangible computer readable media, such as memory 406 or persistent storage 408.

Program code 418 is located in a functional form on computer readable media 420 that is selectively removable and may be loaded onto or transferred to data processing system 400 for execution by processor unit 404. Program code 418 and computer readable media 420 form computer program product 422 in these examples. In one example, computer readable media 420 may be in a tangible form, such as, for example, an optical or magnetic disc that is inserted or placed into a drive or other device that is part of persistent storage 408 for transfer onto a storage device, such as a hard drive that is part of persistent storage 408. In a tangible form, computer readable media 420 also may take the form of a persistent storage, such as a hard drive, a thumb drive, or a flash memory that is connected to data processing system 400. The tangible form of computer readable media 420 is also referred to as computer recordable storage media. In some instances, computer readable media 420 may not be removable.

Alternatively, program code 418 may be transferred to data processing system 400 from computer readable media 420 through a communications link to communications unit 410 and/or through a connection to input/output unit 412. The communications link and/or the connection may be physical or wireless in the illustrative examples. The computer readable media also may take the form of non-tangible media, such as communications links or wireless transmissions containing the program code.

In some illustrative embodiments, program code 418 may be downloaded over a network to persistent storage 408 from another device or data processing system for use within data processing system 400. For instance, program code stored in a computer readable storage medium in a server data processing system may be downloaded over a network from the server to data processing system 400. The data processing system providing program code 418 may be a server computer, a client computer, or some other device capable of storing and transmitting program code 418.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 400 is any hardware apparatus that may store data. Memory 406, persistent storage 408 and computer readable media 420 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406 or a cache such as found in an interface and memory controller hub that may be present in communications fabric 402.

Figure 5:
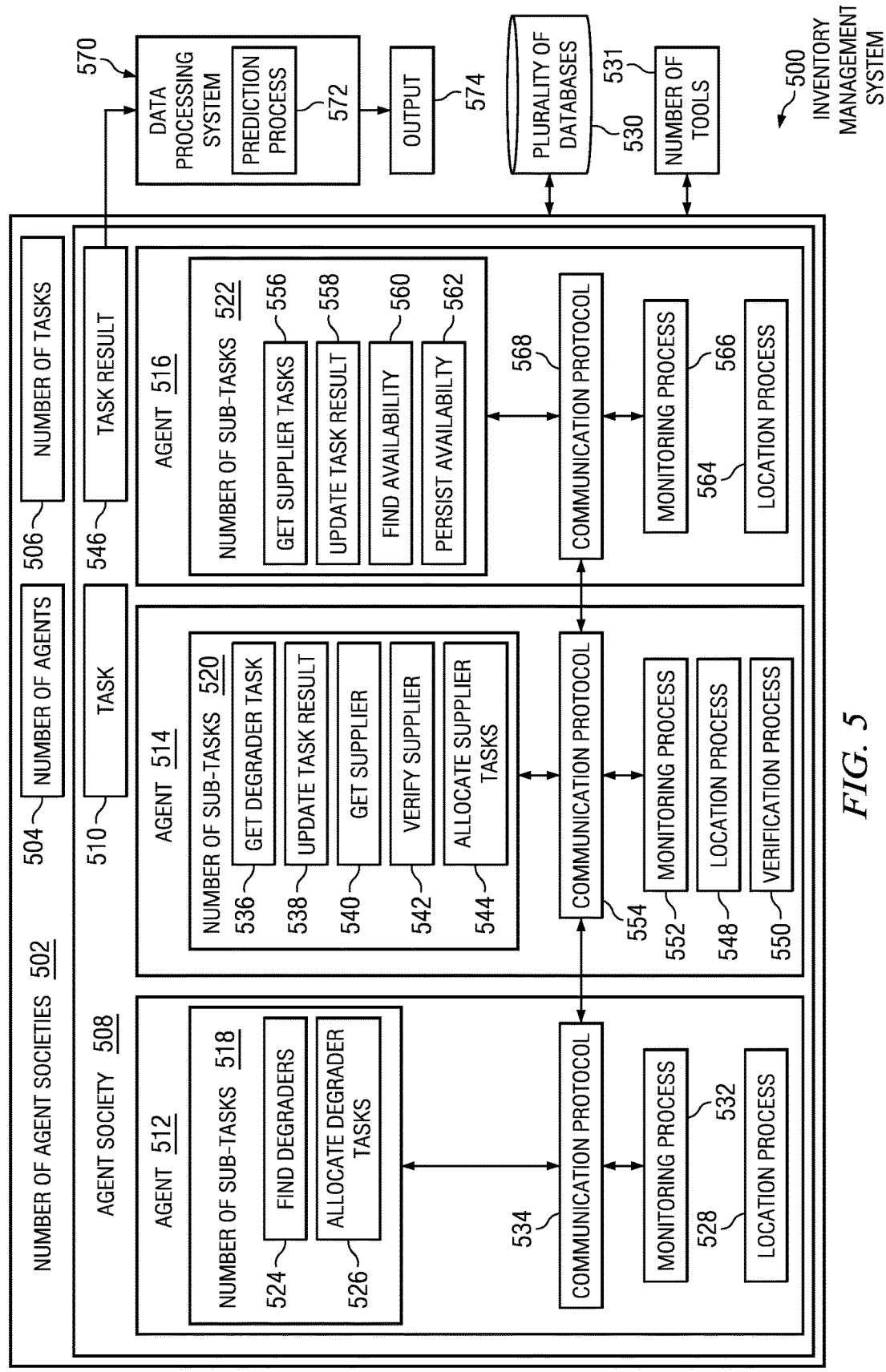
FIG. 5 is an illustration of an inventory management system in accordance with an advantageous embodiment.

With reference now to FIG. 5, an illustration of an inventory management system is depicted in accordance with an advantageous embodiment. Inventory management system 500 may be an illustrative example of one implementation of inventory management system 302 in FIG. 3.

Inventory management system 500 includes number of agent societies 502. Number of agent societies 502 includes number of agents 504 and number of tasks 506. Number of tasks 506 may be assigned to number of agent societies 502 by an agent generation process, such as, for example, agent generation process 324 in FIG. 3. Each agent society in number of agent societies 502 may include one or more agents from number of agents 504. Agent society 508 may be an illustrative example of one implementation of an agent society in number of agent societies 502.

Agent society 508 is assigned to task 510. Task 510 is a conceptual task with multiple parts, for example. Each agent participates in different parts of task 510, handing off task 510 to one agent or another as parts of the task are completed, for example. Agent society 508 includes agent 512, agent 514, and agent 516. The multiple parts of task 510 may be considered sub-tasks handled by each of agents 512, 514, and 516, for example. In this illustrative example, agent 512 takes task 510 and executes number of sub-tasks 518.

Number of sub-tasks 518 may include tasks such as, without limitation, find degraders 524 and allocate degrader tasks 526, and/or any other suitable task. A degrader may be a part, number of parts, and/or maintenance that causes a structure to be temporarily out of service. In one illustrative example, a degrader may be a part of an aircraft that causes the aircraft to be grounded. The sub-tasks tell the allocated agent what to perform. The sub-tasks may also include specific information on how to perform the task and/or constraints, such as time or resource constraints, for example.

Agent 512 may be associated with a number of plug-ins, allocated during agent generation, by agent generation process 324 in FIG. 3 for example, using an initial configuration file from number of configuration profiles 325 in FIG. 3 for agent society 508. The initial configuration file may contain, for example, without limitation, agent identification, agent description, plug-ins, and services needed to perform task 510. Agent 512, agent 514, and agent 516 may use a service discovery plug-in to manage the number of services each agent provides, for example.

In one illustrative example, where agent society 508 uses a service discovery plug-in, each of agents 512, 514, and 516 registers with the discovery service and provides its individual agent capabilities to the discovery service. Agent 512 may then query the discovery service as to which agent can perform a degrader task, for example, and the discovery service can provide agent 512 with a list of agents capable of the task agent 512 is requesting. Agent 512 uses the list of agents provided by the discovery service to allocate degrader tasks 526.

In another illustrative example, where each agent in agent society 508 is pre-defined to manage certain types of tasks, the configuration profile used to generate agent society 508 will specify the agent capabilities and tasks to each of agents 512, 514, and 516 during agent generation. The agents will then communicate and transfer parts of task 510 to one another accordingly.

Agent 512 may use location process 528 to execute the sub-task find degraders 524. Location process 528 may enable agent 512 to access plurality of databases 530 and/or number of tools 531 to locate degraders. Monitoring process 532 uses communications protocol 534 to look for incoming completed sub-tasks, or parts of task 510, from agent 514 that agent 512 can then rescind. In this illustrative example, agent 512 is a master agent and agent 514 is subordinate to agent 512. Agent 512 may also use communication protocol 534 to post sub-tasks or pass task 510 to another agent, such as agent 514, upon completion of sub-tasks 518, for example.

In an illustrative example, where agent 512 is a degrader agent, agent 512 executes find degraders 524 and locates a degrader from a degrader database in plurality of databases 530. Agent 512 then executes allocate degrader task 526 to send a sub-task to the appropriate agent, such as get degrader task 536 to agent 514, to find the supplier or suppliers for the part identified as a degrader, in this example. Another sub-task allocated by agent 514 may be, for example, without limitation, find availability 560 allocated to agent 516. The agent designated as a degrader agent, such as agent 512 in this example, monitors for completion of the degrader sub-tasks and the completion of the sub-tasks allocated to additional agents, such as find availability 560 sent to agent 516 by agent 514.

Agent 514 may accept number of sub-tasks 520, which may include tasks such as, without limitation, get degrader task 536, update task result 538, get supplier 540, verify supplier 542, allocate supplier tasks 544, and/or any other suitable task. Get degrader task 536 may be taking receipt of a task allocated by agent 512 executing allocate degrader tasks 526, for example. Update task result 538 may be posted to communication protocol 554 for transmission to communication protocol 534 of agent 512. Monitoring process 532 detects the completed get degrader task 536 at communication protocol 554 and rescinds get degrader task 536. Rescinding a task and/or sub-task removes the task and/or sub-task from both the master and subordinate agent's communication protocols. In an illustrative example, agent 514 may execute update task result 538 to send updated information about the located degraders to task result 546.

In another illustrative example, when agent 512 executes find degrader 524 and locates a degrader, agent 512 begins to continually monitor the part number associated with the degrader in plurality of databases 530. Agent 512 may also create a sub-task to find a supplier for the degrader identified, such as get supplier 540, and allocate the sub-task to another agent, such as agent 514. Agent 514 may be designated as a supplier agent in this example. Agent 514 receives get supplier 540 sub-task and updates task result 546 to acknowledge allocation of the sub-task. Agent 514 updates task result 546 upon completion of the sub-task get supplier 540, which signals to agent 512 monitoring for completion of get supplier 540 that the sub-task is completed.

Get supplier 540 may be executed by agent 514 using location process 548 to locate a number of suppliers associated with the degraders identified by agent 512. Location process 548 may access plurality of databases 530 and/or number of tools 531 to identify the suppliers, for example. After locating the suppliers, agent 514 may move to a next sub-task, such as verify supplier 542, for example. In an illustrative example, agents may use plug-ins having subscriptions to certain objects and/or events, which may trigger an agent to work a particular sub-task. In another illustrative example, agents may utilize a workflow to perform sub-tasks in a particular order and communicate with each other through a task framework. A workflow service may be in process through a number of plug-ins accessible to an agent, for example. Verify supplier 542 may be executed by agent 514 using verification process 550, for example. Verification process 550 may access plurality of databases 530 to locate a database maintaining a list of current suppliers, for example. Agent 514 may also employ monitoring process 552 to monitor for tasks agent 514 can execute and/or for completion of tasks allocated by agent 514 to other agents, for example. Agent 514 may also use communication protocol 554 to send allocated supplier tasks to agent 516 upon execution of sub-task allocate supplier tasks 544.

Agent 516 may be assigned number of sub-tasks 522, which may include tasks such as, without limitation, get supplier tasks 556, update task result 558, find availability 560, persist availability 562, and/or any other suitable task. Find availability 560 searches supplier databases located in plurality of databases 530 and retrieves all of the suppliers of a particular part or degrader, for example, along with detailed information including attributes of the part or degrader. These attributes may include, without limitation, supplier name, commercial and government entity (CAGE) code, last time to buy, quantity on hand, consumption rate, and/or any other suitable information. Persist availability 562 then stores the availability information in the inventory management database, such as inventory management database 610 in FIG. 6, for example. CAGE codes are manufacturer codes for parts.

Agent 516 may also include monitoring process 566, similar to monitoring process 532 and monitoring process 552, which looks for a task via a subscription. In an illustrative example, where agent 516 is a master to an additional subordinate agent, agent 516 may pick up a task identified as completed by monitoring process 566. Once confirmed as completed, agent 516 will rescind the task and move it out of memory, in this example. In an illustrative example, where agent society 508 includes only agent 512, agent 514, and agent 516, agent 516 may not include monitoring process 566. In this example, because there is no subordinate agent to agent 516, monitoring process 566 may be unnecessary. Agent 516 may also include communication protocol 568, which provides communication between agent 516 and agents 512 and 514.

Task result 546 may be continuously sent to data processing system 570 during execution of task 510. Task result 546 may be used by prediction process 572 to generate output 574. Output 574 may be an illustrative example of one implementation of output 326 in FIG. 3.

The illustration of inventory management system 500 in FIG. 5 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 6:
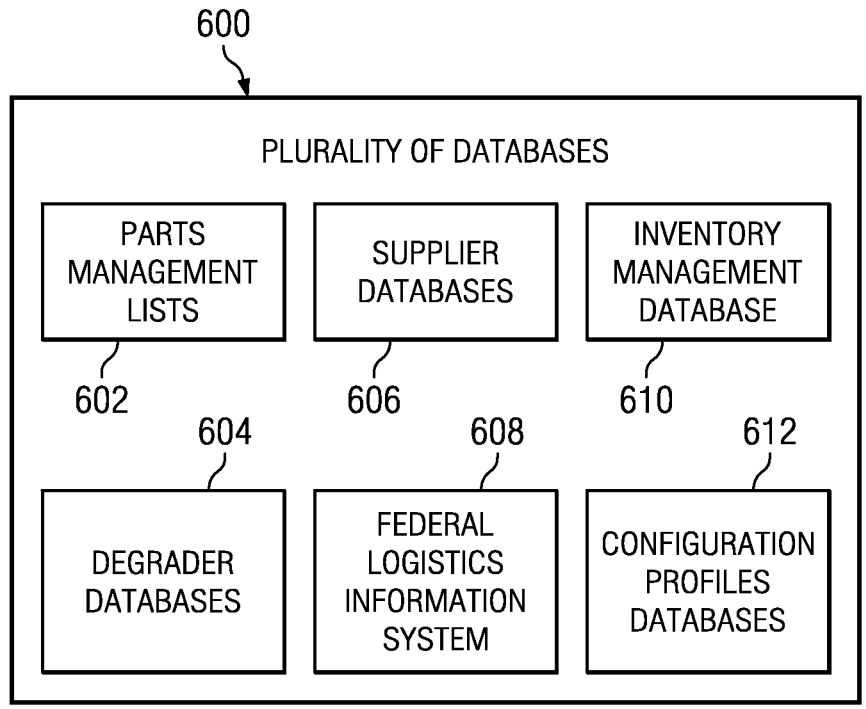
FIG. 6 is an illustration of a plurality of databases in accordance with an advantageous embodiment.

With reference now to FIG. 6, an illustration of a plurality of databases is depicted in accordance with an advantageous embodiment. Plurality of databases 600 may be an illustrative example of one implementation of plurality of databases 316 in FIG. 3, and/or plurality of databases 530 in FIG. 5. Plurality of databases 600 may be distributed across a network environment, such as inventory management environment 300 in FIG. 3, for example.

Plurality of databases 600 includes parts management lists 602, degrader databases 604, supplier databases 606, federal logistics information system 608, inventory management database 610, and configuration profiles database 612. Parts management lists 602 may include a number of parts to monitor and information for each of the parts, such as part numbers for example.

Degrader databases 604 may include information about degraders, including part numbers for the degraders listed, for example. Supplier databases 606 may be a number of individual supplier databases. Supplier databases 606 may include a supplier's enterprise resource planning database, for example. Supplier databases 606 may include information such as, without limitation, supplier name, product name, part number, last time buy date, discontinuance date, quantity on-hand, and/or any other suitable information about parts provided by a supplier.

Federal logistics information system 608 may include, without limitation, a list of current suppliers for use in supplier verification, current part numbers, and/or any other suitable information.

Inventory management database 610 includes stored information from task and sub-task activities of agents, such as agents 512, 514, and 516 in FIG. 5, for example. Information stored in inventory management database 610 may include, without limitation, part availability, part supplier, commercial and government entity (CAGE) codes, quantity on hand, material associated with parts, comments, consumption rate, current availability, discontinuance date, last time buy date, and/or any other suitable information.

Configuration profiles database 612 includes a number of initial configuration profiles for agent societies, such as number of agent societies 312 in FIG. 3.

The illustration of plurality of databases 600 in FIG. 6 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, plurality of databases 600 may be implemented without configuration profiles database 612. In another advantageous embodiment, plurality of databases may include parts manufacturer databases, for example.

Figure 7:
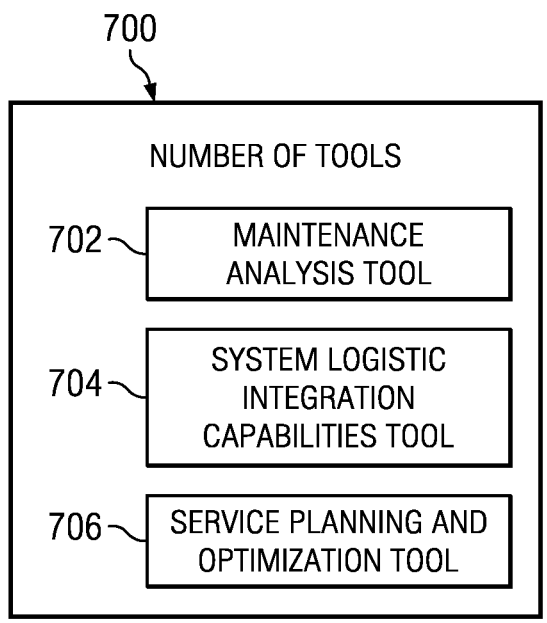
FIG. 7 is an illustration of a number of tools in accordance with an advantageous embodiment.

With reference now to FIG. 7, an illustration of a number of tools is depicted in accordance with an advantageous embodiment. Number of tools 700 may be an illustrative example of one implementation of number of tools 314 in FIG. 3 and/or number of tools 531 in FIG. 5.

Number of tools 700 may include maintenance analysis tool 702, system logistic integration capabilities tool 704, and service planning and optimization tool 706. Maintenance analysis tool 702 may include elements such as, without limitation, a degrader list, part numbers, part nomenclature, source maintainability and recovery, national item identification number, and/or any other suitable elements.

System logistic integration capabilities tool 704 may include elements such as, without limitation, commercial and government entity (CAGE) information, reference numbers, suppliers, supply chain management program, bill of material and configuration management data, and/or any other suitable elements. Service Planning and Optimization (SPO) tool 706 provides a demand planning forecast based on prior actual supply data. Agents and/or agent societies may run in the background of maintenance analysis tool 702, system logistic integration capabilities tool 704, and/or service planning and optimization tool 706 to access and query database information, for example.

The illustration of number of tools 700 in FIG. 7 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 8:
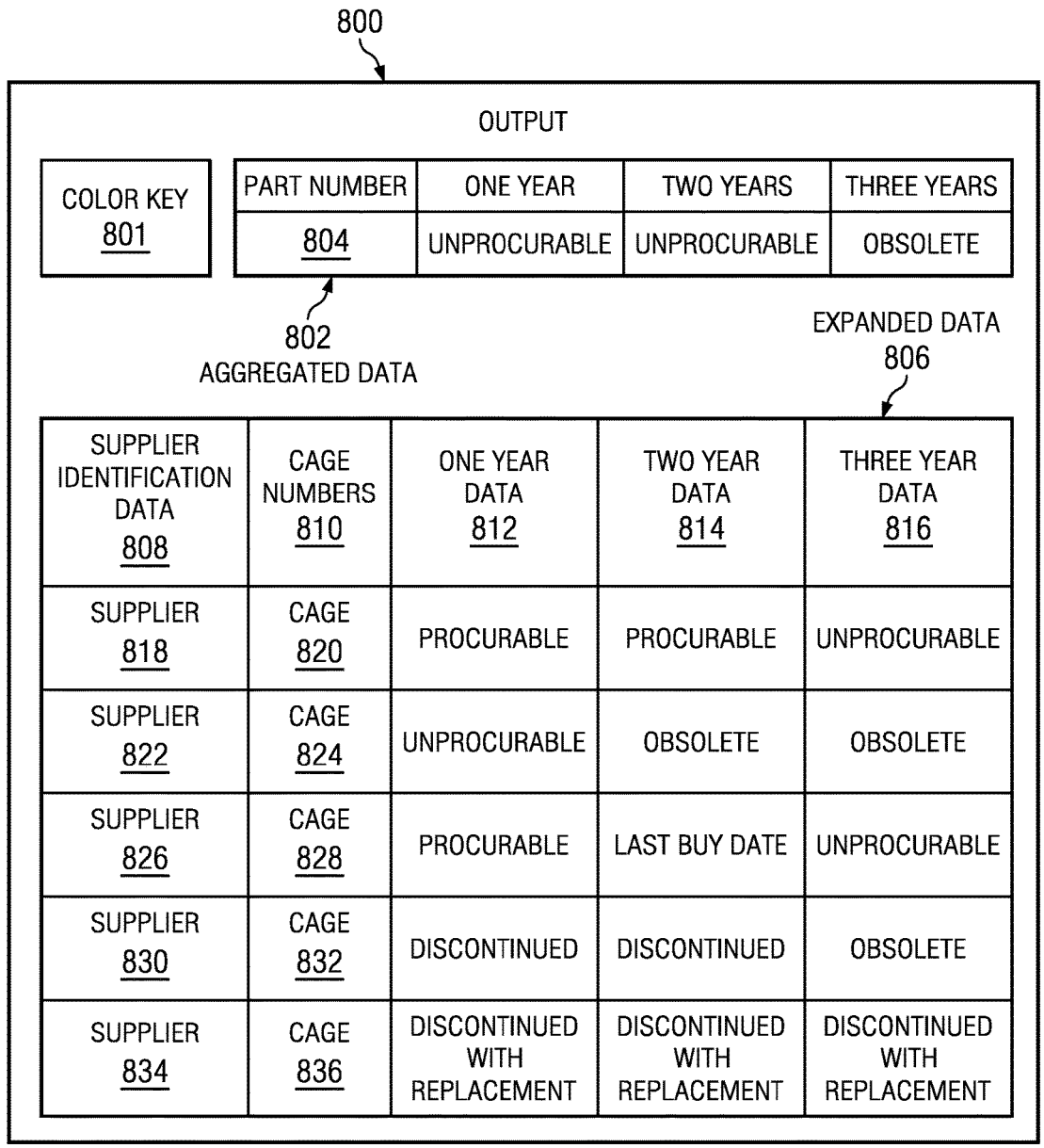
FIG. 8 is an illustration of an output in accordance with an advantageous embodiment.

With reference now to FIG. 8, an illustration of an output is depicted in accordance with an advantageous embodiment. Output 800 may be an illustrative example of one implementation of output 326 in FIG. 3 and/or output 574 in FIG. 5.

Output 800 may be presented in a spreadsheet view format using color coding to identify various types of information. Color key 801 may be provided to identify the color coding of the information presented in output 800. Output 800 may include aggregated data 802 for part 804 and expanded data 806 for part 804, for example. Information presented may include, without limitation, procurability prediction for part 804, supplier identification data, commercial and government entity (CAGE) numbers, one year data, two year data, three year data, and/or any other suitable type of information, for example.

In an illustrative example, aggregated data 802 may be presented for part 804, indicating part 804 is predicted to be unprocurable in one year, unprocurable in two years, and obsolete in three years. Aggregated data 802 is an illustrative example of one implementation of a procurability prediction generated by an inventory management system, such as inventory management system 302 using prediction process 328 and aggregation process 329 in FIG. 3. Selection of part 804 in aggregated data 802 using a user interface may present expanded data 806, allowing a user, such as asset manager 308 in FIG. 3, to drill down on specific information used to form the prediction presented by aggregated data 802.

Expanded data 806 includes may include supplier identification data 808, commercial and government entity (CAGE) numbers 810, one year data 812, two year data 814, and three year data 816 for part 804. One year data 812 includes information for the current year plus one additional year into the future. Two year data 814 includes information for the current year plus two additional years into the future. Three year data 816 includes information for the current year plus three additional years into the future. The information provided by one year data 812, two year data 814, and three year data 816 may be used to predict obsolescence for a three to five year window into the future, for example. Supplier 818 may be associated with CAGE 820. Information for supplier 818 includes procurability information for part 804 from supplier 818. One year data 812 for supplier 818 may indicate "procurable." Two year data 814 for supplier 818 may indicate "procurable." Three year data 816 for supplier 818 may indicate "unprocurable." Each cell under the column one year data 812 and two year data 814 in the row of information for supplier 818 may be color coded in green, for example. In this example, color key 801 may indicate that the color green is associated with procurable parts. The criteria for an indication of "procurable" may be, for example, a minimum of one supplier available showing as an active supplier.

The cell under the column three year data 816 in the row of information for supplier 818 may be color coded in yellow, for example. In this example, color key 801 may indicate that the color yellow is associated with unprocurable parts and/or parts with a scheduled last time buy date. The criteria for an indication of "unprocurable" may be, for example, that the exact part as specified is not available, but a possible replacement part has been identified as available and needs review and appropriate action by an asset manager, such as asset manager 308 in FIG. 3. A last time buy date may indicate that part 804 has a last buy date announced from a sole source supplier, for example.

In another illustrative example, information may be presented for supplier 822 associated with CAGE 820. Information for supplier 822 includes procurability information for part 804 from supplier 822. One year data 812 for supplier 822 may indicate "unprocurable." Two year data 814 for supplier 822 may indicate "obsolete." Three year data 816 for supplier 822 may indicate "obsolete." The cell in column one year data 812 for the row of information for supplier 822 may be color coded in yellow, for example, with color key 801 indicating that the color yellow is associated with unprocurable parts.

The cell in column two year data 814 for the row of information for supplier 822 may be color coded in red, for example, with color key 801 indicating that the color red is associated with obsolete and/or discontinued parts. The criteria for an indication of "obsolete" may be, for example, no manufacturer available to make the part and no alternate part(s) available, with the notice less than three years into the future. An obsolete part may have no obvious form fit function replacement, but may still be available from a lot buy inventory or aftermarket supplier, for example. The criteria for an indication of "discontinued" may be, for example, that the manufacturer(s) of the part have stopped production of the part, but the part is still available through a lot buy inventory or aftermarket supplier. A discontinued part may have a possible form fit function replacement available, distinguishing it from an obsolete part. The cell in column three year data 816 for the row of information for supplier 822 may also be color coded in red, in this example.

In another illustrative example, information may be presented for supplier 826 associated with CAGE 828. One year data 812 for supplier 826 may indicate "procurable." Two year data 814 for supplier 826 may indicate "last buy date." Three year data 816 for supplier 826 may indicate "unprocurable." The cell in column one year data 812 for the row of information for supplier 826 may be color coded in green, for example, with color key 801 indicating that the color green is associated with procurable parts. The cell in column two year data 814 for the row of information for supplier 826 may be color coded in yellow, for example, with color key 801 indicating that the color yellow is associated with unprocurable parts and/or parts with an announced last time buy date. The cell in column three year data 816 for the row of information for supplier 826 may also be color coded in yellow, in this example, indicated unprocurable.

In another illustrative example, information may be presented for supplier 830 associated with CAGE 832. One year data 812 for supplier 830 may indicate "discontinued." Two year data 814 for supplier 830 may indicate "discontinued." Three year data 816 for supplier 830 may indicate "obsolete." The cell in column one year data 812 for the row of information for supplier 830 may be color coded in red, for example, with color key 801 indicating that the color red is associated with obsolete and/or discontinued parts. The cell in column two year data 814 and the cell in column three year data 816 for the row of information for supplier 830 may also be color coded in red in this example.

In another illustrative example, information may be presented for supplier 834 associated with CAGE 836. One year data 812 for supplier 834 may indicate "discontinued with replacement." Two year data 814 for supplier 834 may indicate "discontinued with replacement." Three year data 816 for supplier 834 may indicate "discontinued with replacement." The cells in columns one year data 812, two year data 814, and three year data 816 for the row of information for supplier 834 may be color coded in orange, for example, with color key 801 indicating that the color orange is associated with parts that have been discontinued with replacements. The criteria for "discontinued with replacement" may be, for example, the manufacturer of the part stops production of the part but an alternate part is available and the notice is less than three years into the future. A discontinued part with a replacement is a part with a possible form fit function replacement, and the possible replacement part has been identified as available. The indication of discontinued with replacement may further indicate a need for review and approval by an asset manager, such as asset manager 308 in FIG. 3.

The illustration of output 800 in FIG. 8 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments output 800 may only include aggregated data 802. A user may select part 804 from aggregated data 802 to access expanded data 806 through a separate output display, for example. In another advantageous embodiment, expanded data 806 may include additional information, or may include fewer or additional suppliers, for example.

Figure 9:
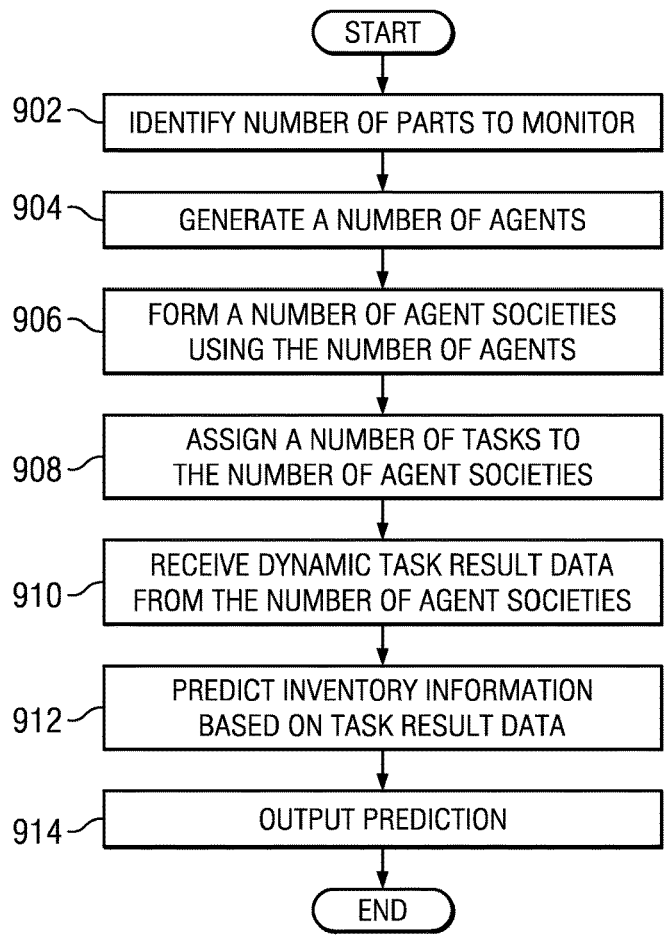
FIG. 9 is an illustration of a flowchart of a process for inventory management in accordance with an advantageous embodiment.

With reference now to FIG. 9, an illustration of a flowchart of a process for inventory management is depicted in accordance with an advantageous embodiment. The process in FIG. 9 may be implemented by a component, such as inventory management system 302 in FIG. 3 and/or inventory management system 500 in FIG. 5.

The process begins by identifying a number of parts to monitor (operation 902). The process generates a number of agents (operation 904). The process then forms a number of agent societies using the number of agents (operation 906). The process assigns a number of tasks to the number of agent societies (operation 908). The process receives dynamic task result data from the number of agent societies (operation 910). The dynamic task result data may be, for example, without limitation, data 334 in FIG. 3. The process predicts inventory information based on the task result data received (operation 912). The process then outputs the prediction (operation 914), with the process terminating thereafter.

Figure 10:
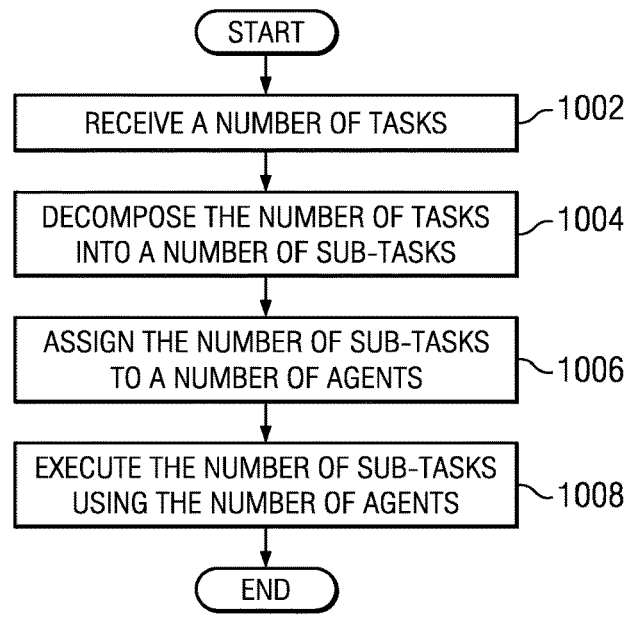
FIG. 10 is an illustration of a flowchart of a process for monitoring parts obsolescence in accordance with an advantageous embodiment.

With reference now to FIG. 10, an illustration of a flowchart of a process for monitoring parts obsolescence is depicted in accordance with an advantageous embodiment. The process in FIG. 10 may be implemented by a component, such as number of agent societies 312 in FIG. 3 and/or agent society 508 in FIG. 5.

The process begins by receiving a number of tasks (operation 1002). The process decomposes the number of tasks into a number of sub-tasks (operation 1004). The process assigns the number of sub-tasks to a number of agents (operation 1006). The process then executes the number of sub-tasks using the number of agents (operation 1008), with the process terminating thereafter.

Figure 11:
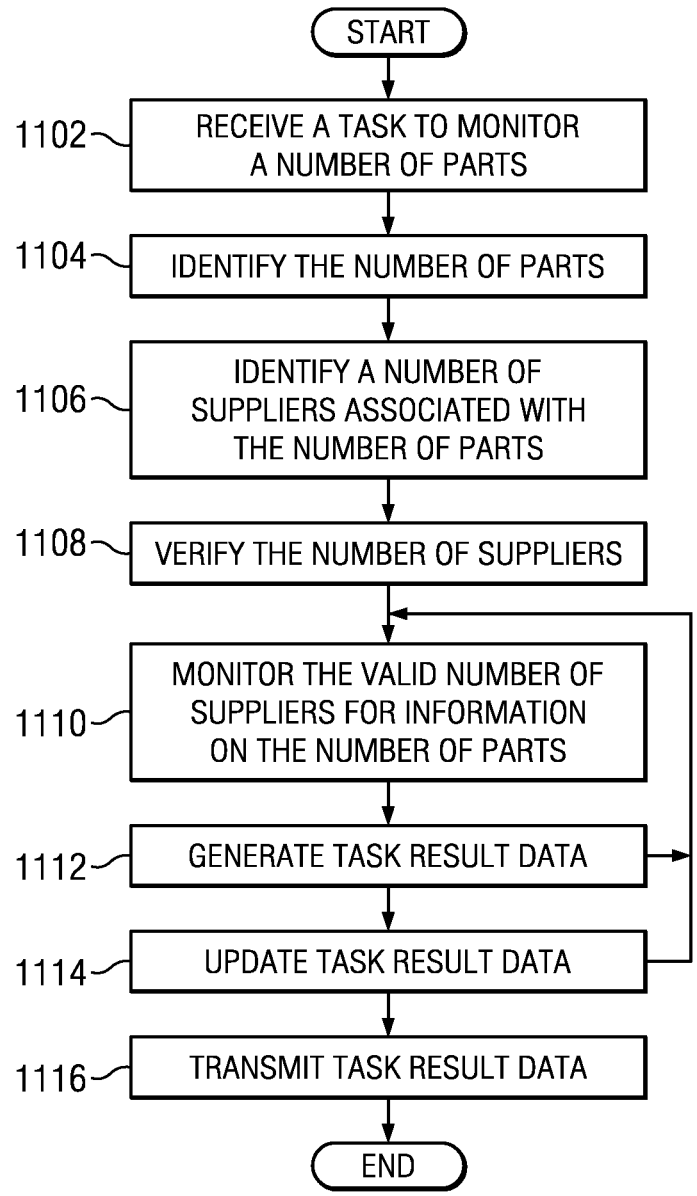
FIG. 11 is an illustration of a flowchart of a process for generating task result data in accordance with an advantageous embodiment.

With reference now to FIG. 11, an illustration of a flowchart of a process for generating task result data is depicted in accordance with an advantageous embodiment. The process in FIG. 11 may be implemented by a component, such as number of agent societies 312 in FIG. 3 and/or agent society 508 in FIG. 5.

The process begins by receiving a task to monitor a number of parts (operation 1102). The process identifies the number of parts (operation 1104). The process then identifies a number of suppliers associated with the number of parts (operation 1106). The process verifies the number of suppliers (operation 1108). The process monitors the valid number of suppliers for information on the number of parts (operation 1110). The process continuously generates task result data (operation 1112) while monitoring the valid number of suppliers for information on the number of parts. The process continuously updates task result data (operation 1114) while generating task result data. The process continuously transmits task result data (operation 1116) while monitoring, generating, and updating in operations 1110, 1112, and 1114, with the process terminating thereafter.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The different advantageous embodiments provide a method and system for monitoring real time part procurement information and identifying procurement issues in advance to mitigate the impact of degraders on operational availability of a structure. The different advantageous embodiments provide a predictive obsolescence management tool for asset and obsolescence managers to utilize in managing obsolescence on a performance based logistics contract or a sustainment contract for all part classes. The different advantageous embodiments provide a system and method using intelligent agent technology to gain obsolescence information directly from supplier's enterprise resource planning systems for accurate and timely procurement information.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for inventory management, the method comprising:
    loading an inventory management system into a storage connected to at least one processor unit of a computer system;
    identifying, by the inventory management system running on the at least one processor unit of a user, a number of parts to monitor at a number of suppliers remote from the user;
    generating, by the inventory management system running on the at least one processor unit, a number of agents to form a number of agent societies, wherein each agent in the number of agents comprises a software program configured to run autonomously to perform a task, wherein an agent society comprises a collection of agents configured to interact with each other through a communication protocol, and wherein the number of agents monitor the number of parts at the number of suppliers;
    assigning, by the inventory management system running on the at least one processor unit, a number of tasks for monitoring the number of parts to the number of agent societies, wherein the number of agent societies obtain data from the number of tasks during performance of the number of tasks by the number of agents, wherein the number of tasks includes monitoring the number of suppliers associated with the number of parts for information on the number of parts;
    executing a find degrader task by a first agent in the number agents to identify a part in the number of parts that causes a structure to be temporarily out of service;
    executing an allocate degrader task by the first agent in the number of agents to send a get supplier sub-task to a second agent in the number of agents;
    executing the get supplier sub-task by the second agent in the number of agents to locate a supplier of the part in the number of suppliers;
    executing an allocate supplier task by the second agent in the number of agents to send a find availability sub-task to a third agent in the number of agents;
    executing the find availability sub-task by the third agent in the number of agents to search a database of the supplier in the number of suppliers to retrieve at least one of a last time buy date and a discontinuance date for the supplier in the number of suppliers for the part in the number of parts;
    sending the at least one of the last time buy date and the discontinuance date to the inventory management system;
    upon receiving the at least one of the last time buy date and the discontinuance date, predicting, by the inventory management system running on the at least one processor unit, a procurability of the number of parts at a number of predetermined intervals subsequent to at least one of the last time buy date and the discontinuance date based on the received at least one of the last time buy date and the discontinuance date to form predicted inventory information, wherein the procurability of the number of parts comprises an ability to order the number of parts from the number of suppliers subsequent to at least one of the last time buy date and the discontinuance date; and
    responsive to forming the predicted inventory information, presenting, by the inventory management system running on the at least one processor unit, the predicted inventory information on a display; and
    wherein the display provides, for a particular part an expanded data in a table showing for each of a number of suppliers of the particular part and for each of one year, two years, and three years, an entry selected from a group consisting of procurable, unprocurable, obsolete, last buy date, discontinued, and discontinued with replacement.

2. The method of claim 1, wherein predicting the procurability of the number of parts at the number of predetermined intervals comprises:
    predicting an obsolescence of the number of parts at the number of predetermined intervals, wherein the obsolescence occurs when no manufacturer is available to make the number of parts at a future date and a replacement part is unavailable at the future date.

3. The method of claim 1, wherein predicting the procurability of the number of parts at the number of predetermined intervals comprises:
    predicting a discontinuation of the number of parts at the number of predetermined intervals, wherein the discontinuation occurs when a number of manufacturers have stopped production of the number of parts and at least one replacement part for the number of parts is available.

4. The method of claim 1, further comprising:
    identifying the number of parts as unprocurable at a future date in the number of predetermined intervals when the number of parts will be in production by a single manufacturer at the future date.

5. The method of claim 1, wherein the predicted inventory information further comprises at least one of procurability, unprocurability, obsolete, and replacement available for each supplier in the number of suppliers at the number of predetermined intervals.

6. A method for monitoring parts obsolescence, the method comprising:
   loading an inventory management system into a storage connected to at least one processor unit of a computer system, the inventory management system comprising an agent generation process;
   creating by the agent generation process a number of agent societies comprising a number of agents, wherein each agent in the number of agents comprises a software program configured to run autonomously to perform a task, and wherein an agent society in the number of agent societies comprises a collection of agents configured to interact with each other through a communications protocol;
   receiving, by the number of agent societies running on the at least one processor unit, a number of tasks, wherein the number of tasks include monitoring a number of parts;
   decomposing, by the number of agent societies running on the at least one processor unit, the number of tasks into a number of sub-tasks;
   assigning, by the number of agent societies running on the at least one processor unit, the number of sub-tasks to the number of agents;
   executing a find degrader task by a first agent in the number agents to identify a part in the number of parts that causes a structure to be temporarily out of service;
   executing an allocate degrader task by the first agent in the number of agents to send a get supplier sub-task to a second agent in the number of agents;
   executing the get supplier sub-task by the second agent in the number of agents to locate a supplier of the part in the number of suppliers;
   executing an allocate supplier task by the second agent in the number of agents to send a find availability sub-task to a third agent in the number of agents;
   executing the find availability sub-task by the third agent in the number of agents to search a database of the supplier in the number of suppliers to retrieve predicted inventory information for the supplier in the number of suppliers, and wherein the predicted inventory information comprises an ability to order the part in the number of parts from the supplier in the number of suppliers at a first number of predetermined intervals;
   predicting, using a prediction process running on the at least one processor unit, a procurability of the number of parts at the first number of predetermined intervals based on the result, wherein the procurability of the number of parts comprises an ability to order the number of parts; and
   presenting, using the inventory management system running on the at least one processor unit, the procurability of the number of parts on a display connected to the at least one processor unit;
   wherein the display provides, for a particular part an expanded data in a table showing for each of a number of suppliers of the particular part and for each of one year, two years, and three years, an entry selected from a group consisting of procurable, unprocurable, obsolete, last buy date, discontinued, and discontinued with replacement.

7. The method of claim 6, wherein the number of sub-tasks further comprises identifying the number of parts, wherein at least one part of the number of parts is a non-electronic part.

8. The method of claim 6, further comprising:
   generating task result data during execution of the number of sub-tasks;
   continuously updating the task result data during execution of the number of sub-tasks to form updated task result data; and
   continuously transmitting the updated task result data during execution of the number of sub-tasks.

9. A non-transitory computer program product having computer usable program code stored on a computer recordable medium and executable by at least one processor unit, the computer program product comprising:
   program code for loading an inventory management system into a storage connected to at least one processor unit of a computer system, the inventory management system comprising an agent generation process, a prediction process, a number of configuration profiles, and an aggregation process;
   program code for identifying a number of parts to monitor;
   program code for generating a number of agents to form a number of agent societies, wherein each agent in the number of agents comprises a software program configured to run autonomously to perform a task, wherein an agent society comprises a collection of agents configured to interact with each other through a communications protocol, and the number of agents configured to monitor the number of parts;
   program code for connecting the number of agents to a number of tools and to a plurality of databases;
   program code for assigning a number of tasks for monitoring the number of parts to the number of agent societies, the number of agent societies configured to obtain data from the number of tasks during performance of the number of tasks by the number of agents, wherein the number of tasks includes monitoring a number of suppliers associated with the number of parts for information on the number of parts;
   program code for executing a find degrader task by a first agent in the number agents to identify a part in the number of parts that causes a structure to be temporarily out of service;
   program code for executing an allocate degrader task by the first agent in the number of agents to send a get supplier sub-task to a second agent in the number of agents;
   program code for executing the get supplier sub-task by the second agent in the number of agents to locate a supplier of the part in the number of suppliers;
   program code for executing an allocate supplier task by the second agent in the number of agents to send a find availability sub-task to a third agent in the number of agents;
   program code for executing the find availability sub-task by the third agent in the number of agents to search a database of the supplier in the number of suppliers to retrieve at least one of a last time buy date and a discontinuance date for the supplier in the number of suppliers for the part in the number of parts;
   program code for predicting a procurability of the number of parts at a first number of predetermined intervals subsequent to at least one of the last time buy date and the discontinuance date based on the received at least one of the last time buy date and the discontinuance date to form predicted inventory information, wherein the procurability of the number of parts comprises an ability to order the number of parts from the number of suppliers subsequent to at least one of the last time buy date and the discontinuance date; and program code for presenting the predicted inventory information on a display connected to the at least one processor unit;

wherein the display provides, for a particular part an expanded data in a table showing for each of a number of suppliers of the particular part and for each of one year, two years, and three years, an entry selected from a group consisting of procurable, unprocurable, obsolete, last buy date, discontinued, and discontinued with replacement.

10. The non-transitory computer program product of claim 9, wherein predicting the procurability of the number of parts at the number of predetermined intervals comprises:
program code for predicting an obsolescence of the number of parts at the number of predetermined intervals, wherein the obsolescence occurs when no manufacturer is available to make the number of parts at a future date and a replacement part is unavailable at the future date.

11. The non-transitory computer program product of claim 9, wherein predicting the procurability of the number of parts at the number of predetermined intervals comprises:
predicting a discontinuation of the number of parts at the number of predetermined intervals, wherein the discontinuation occurs when a number of manufacturers have stopped production of the number of parts and at least one replacement part for the number of parts is available.

12. The non-transitory computer program product of claim 9, further comprising:
program code for identifying the number of parts as unprocurable at a future date in the number of predetermined intervals when the number of parts will be in production by a single manufacturer at the future date.

13. The non-transitory computer program product of claim 9, wherein the predicted inventory information further comprises at least one of procurability, unprocurability, obsolete, and replacement available for each supplier in the number of suppliers at the first number of predetermined intervals.

14. A system for inventory management, the system comprising:
an inventory management system, the inventory management system comprising an agent generation process, a prediction process, a number of configuration profiles, and an aggregation process;
wherein the agent generation process is configured to generate a number of agent societies comprising a number of agents; wherein the number of agent societies are connected to a number of tools and a plurality of databases; wherein the number of tools comprise a maintenance analysis tool, a system logistic integration capabilities tool and a service planning and optimization tool; wherein the plurality of databases comprise parts management lists, supplier databases, an inventory management database, degrader databases, a federal logistics information system, and configuration profile databases;
wherein the prediction process is configured to generate predicted inventory information; and
a data processing system comprising at least one processor unit configured to execute the agent generation process and the prediction process to identify a number of parts to monitor;
generate a number of agents to form a number of agent societies, wherein each agent in the number of agents comprises a software program configured to run autonomously to perform a task, wherein an agent society comprises a collection of one or more agents configured to interact with each other through a communications protocol, the number of agents configured to monitor the number of parts; execute a find degrader task by a first agent in the number agents to identify a part in the number of parts that causes a structure to be temporarily out of service; execute an allocate degrader task by the first agent in the number of agents to send a get supplier sub-task to a second agent in the number of agents; execute the get supplier sub-task by the second agent in the number of agents to locate a supplier of the part in the number of suppliers; execute an allocate supplier task by the second agent in the number of agents to send a find availability sub-task to a third agent in the number of agents; execute the find availability sub-task by the third agent in the number of agents to search a database of the supplier in the number of suppliers to retrieve at least one of a last time buy date and a discontinuance date for the supplier in the number of suppliers for the part in the number of parts; and predict a procurability of the number of parts at a first number of predetermined intervals subsequent to at least one of the last time buy date and the discontinuance date based on the received at least one of the last time buy date and the discontinuance date to form predicted inventory information, wherein the procurability of the number of parts comprises an ability to order the number of parts from the number of suppliers subsequent to at least one of the last time buy date and the discontinuance date and, responsive to forming the predicted inventory information, presenting the predicted inventory information on a display;
wherein the display provides, for a particular part an expanded data in a table showing for each of a number of suppliers of the particular part and for each of one year, two years, and three years, an entry selected from a group consisting of procurable, unprocurable, obsolete, last buy date, discontinued, and discontinued with replacement.

15. The system of claim 14, wherein in being configured to execute the agent generation process and the prediction process to predict the procurability of the number of parts at a number of predetermined intervals, the data processing system is further configured to execute the prediction process to predict an obsolescence of the number of parts at the number of predetermined intervals, wherein the obsolescence occurs when no manufacturer is available to make the number of parts at a future date and a replacement part is unavailable at the future date.

16. The system of claim 14, wherein in being configured to execute the agent generation process and the prediction process to predict the procurability of the number of parts at a number of predetermined intervals, the data processing system is further configured to execute the prediction process to predict a discontinuation of the number of parts at the number of predetermined intervals, wherein the discontinuation occurs when a number of manufacturers have stopped production of the number of parts and at least one replacement part for the number of parts is available.

17. The system of claim 14, wherein the data processing system is further configured to execute the prediction process to identify the number of parts as unprocurable at a future date in the number of predetermined intervals when the number of parts will be in production by a single manufacturer at the future date.

18. The method of claim 6, wherein predicting a procurability further comprises predicting a procurability of the number of parts at a second number of predetermined intervals based on the result, wherein the second number of predetermined intervals is farther in the future than the first number of predetermined intervals.

19. The method of claim 1, wherein at least one part in the number of parts is a non-electronic part.

20. The method of claim 1, wherein the number of tasks further comprises:
    identifying a plurality of suppliers associated with the number of parts; and
    verifying the plurality of suppliers using a federal database to form the number of suppliers associated with the number of parts.

21. The method of claim 1, wherein predicting a procurability further comprises utilizing business logic to escalate obsolescence information.

22. The method for inventory management of claim 1, wherein the inventory management system comprises an agent generation process, a prediction process, a number of configuration profiles, and an aggregation process; wherein the number of agents are connected to a number of tools and a plurality of databases; wherein the number of tools comprise a maintenance analysis tool, a system logistic integration capabilities tool and a service planning and optimization tool; wherein the plurality of databases comprise parts management lists, supplier databases, an inventory management database, degrader databases, a federal logistics information system, and configuration profile databases; and wherein the inventory management system prevents delay in aircraft manufacturing by dynamically displaying information regarding obsolescent parts to the aircraft manufacturer.

23. The method of claim 6, further comprising, wherein the inventory management system further comprises a prediction process, a number of configuration profiles, and an aggregation process; wherein the number of agents are connected to a number of tools and a plurality of databases; wherein the number of tools comprise a maintenance analysis tool, a system logistic integration capabilities tool and a service planning and optimization tool; wherein the plurality of databases comprise parts management lists, supplier databases, an inventory management database, degrader databases, a federal logistics information system, and configuration profile databases.

24. The computer program product of claim 9, wherein the number of tools comprise a maintenance analysis tool, a system logistic integration capabilities tool and a service planning and optimization tool; wherein the plurality of databases comprise parts management lists, supplier databases, an inventory management database, degrader databases, a federal logistics information system, and configuration profile databases.

\* \* \* \* \*